United States Patent
Jesus De Sequeira Serra Nunes

(10) Patent No.: US 9,260,350 B2
(45) Date of Patent: Feb. 16, 2016

(54) WHITE OR COLORED CEMENTITIOUS COATING WITH HYDROCHROMATIC PROPERTIES

(71) Applicant: SECIL S.A.—COMPANHIA GERAL DE CAL E CIMENTO, Setubal (PT)

(72) Inventor: Angela Maria Jesus De Sequeira Serra Nunes, Vila Nogueira de Azeitao (PT)

(73) Assignee: SECIL, S.A.—Companhia Geral de Cal e Cimento of Outao, Setubal (PT)

( * ) Notice: Subject to any disclaimer, the term of this patent is extended or adjusted under 35 U.S.C. 154(b) by 0 days.

(21) Appl. No.: 14/437,235

(22) PCT Filed: Oct. 21, 2013

(86) PCT No.: PCT/PT2013/000060
§ 371 (c)(1),
(2) Date: Apr. 21, 2015

(87) PCT Pub. No.: WO2014/065684
PCT Pub. Date: May 1, 2014

(65) Prior Publication Data
US 2015/0266784 A1    Sep. 24, 2015

(30) Foreign Application Priority Data
Oct. 22, 2012 (PT) ........................................ 106591

(51) Int. Cl.
| | | |
|---|---|---|
| *C04B 28/04* | (2006.01) | |
| *C04B 41/50* | (2006.01) | |
| *C04B 40/00* | (2006.01) | |
| *C04B 41/48* | (2006.01) | |
| C04B 111/00 | (2006.01) | |
| C04B 111/80 | (2006.01) | |

(52) U.S. Cl.
CPC ............. *C04B 41/5079* (2013.01); *C04B 28/04* (2013.01); *C04B 40/0039* (2013.01); *C04B 41/483* (2013.01); *C04B 2111/00482* (2013.01); *C04B 2111/802* (2013.01)

(58) Field of Classification Search
CPC .. C04B 41/5079; C04B 41/483; C04B 28/04; C04B 40/0039; C04B 2111/00482; C04B 2111/802
USPC ............ 524/5, 401, 515, 523, 524, 528, 565, 524/568
See application file for complete search history.

(56) References Cited

FOREIGN PATENT DOCUMENTS

| | | |
|---|---|---|
| DE | 20 2004 017418 U1 | 1/2005 |
| KR | 100 890 863 B1 | 3/2009 |
| KR | 10-2010-0072530 A | 7/2010 |
| PL | 2228352 A1 * 9/2010 | .......... C04B 20/1018 |
| WO | 2004/026999 A2 | 4/2004 |

* cited by examiner

*Primary Examiner* — Kelechi Egwim
(74) *Attorney, Agent, or Firm* — Sughrue Mion, PLLC

(57) ABSTRACT

The present invention relates to a cementitious coating with hydrochromatic properties for micro-concrete or normal concrete, mortar, or other construction materials based on cement and ceramics. This cementitious coating in acrylic solution changes its opacity depending on the presence of water and moisture. This color change is reversible after some drying time leaving invisible the markings already existing on the substrate. This cementitious coating comprises the following components, in percentage in weight of the components relative to the total weight of the composition: a) 0.5-30% of hydrochromatic acrylic copolymer emulsion; b) 5-30% of white or gray Portland cement; c) 0.1-30% of finely ground limestone filler; d) 0.01-2% of powdered super-plasticizer; e) 0.01-3% of modified polyvinyl resins; f) 0.01-5% of dispersant of vinyl acetate and ethylene copolymers; g) 15-70% of aqueous acrylic emulsion; and optionally h) 0.1-15% of inorganic pigments.

6 Claims, 1 Drawing Sheet

WHITE OR COLORED CEMENTITIOUS COATING WITH HYDROCHROMATIC PROPERTIES

CROSS REFERENCE TO RELATED APPLICATIONS

This application is a National Stage of International Application No. PCT/PT2013/000060 filed Oct. 21, 2013, claiming priority based on Portuguese Patent Application No. 106591 filed Oct. 22, 2012, the contents of all of which are incorporated herein by reference in their entirety.

FIELD OF THE INVENTION

The present invention falls in the field of new building materials, particularly in surface coatings with hydrochromatic properties for concrete and micro-concrete, mortar or other construction materials based on cement and ceramics. There is a large number of applications on structural and architectural concrete, such as façades, walls, urban furniture and other decorative elements, exposed to weather. Such coated parts, while wet, can exhibit colors already existing on the substrate, or even drawings, texts and all kind of desired markings, being hidden once more after the coating has dried.

BACKGROUND OF THE INVENTION

Exposed concrete, i.e. with high performance at architectural level, is nowadays a widely used material in architecture and civil engineering, helping to answer to many technical and aesthetic challenges required by current architectonic trends. The same happens with coating mortars and finishing pastes generally covering actual buildings.

The possibility of transmitting changes, due to the presence of water, to the surface appearance of concrete and plaster or other mortars has the largest interest in architectural area, as well as in the communication and information areas.

Patent KR100890863 describes a thermochromatic concrete, i.e., a product obtained by the introduction of a thermochromatic pigment in a normal concrete, allowing the color to change as a function of temperature.

Also patent KR20100072530 refers to the use of thermochromatic pigments for insertion into concrete surface during its casting, by surface coating of the mold, so as to change surface color by the effect of temperature.

SUMMARY OF THE INVENTION

Figure 1:
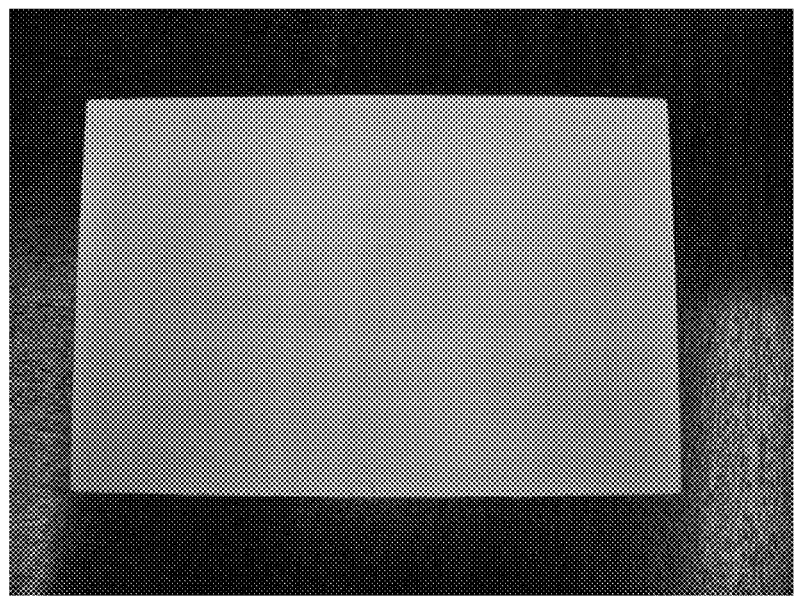
FIG. 1 shows the concrete plates coated with hydrochromatic cement coating, while dried.
Figure 2:
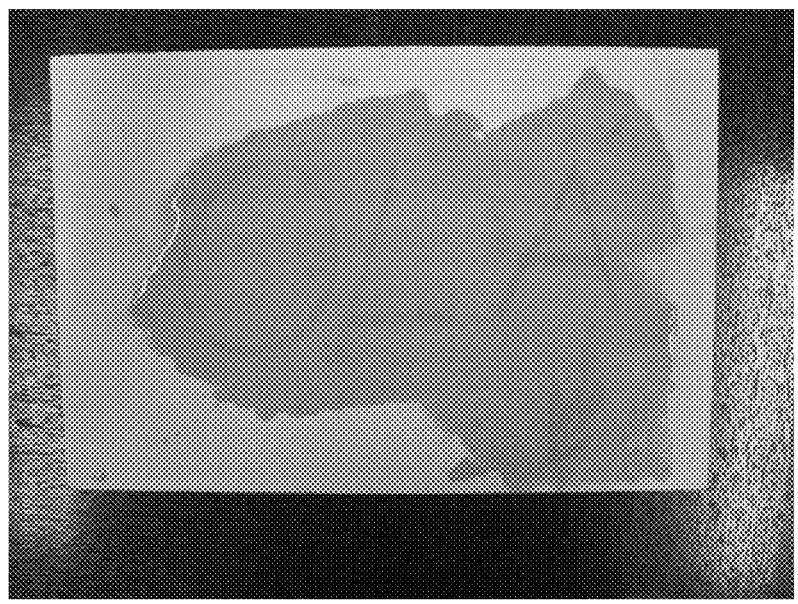
FIG. 2 shows the concrete plates coated with hydrochromatic cement coating after being wetted, wherein the markings already existing on the substrate are now visible.

This invention allows solving the technical problem consisting on having a white or colored coating to micro-concrete, concrete, mortar and other cementitious and ceramic materials which allow the exhibition of different appearances depending on the fact they are dry or wet. This can be a change in color, when the substrate exhibits a homogeneous color different from the application, drawings, paintings, markings or other, which become invisible after the surface has dried once more.

A technical solution has been found which allows, departing from aqueous acrylic solutions with white or colored cementitious fillers and hydrochromatic pigments properly stabilized, to prepare a coating for surfaces of concrete, mortar and similar with high adhesion and durability, which can transmit an homogeneous appearance to the surface while dried, and can exhibit, when wetted, the patterns already existing on the coating substrate.

DETAILED DESCRIPTION OF THE INVENTION

The present invention relates to a surface coating with hydrochromatic properties for concrete and micro-concrete, mortar or other construction materials based on cement and ceramics. There is a large number of applications on structural and architectural concrete, such as façades, walls, urban furniture and other coating decorative elements, exposed to weather. Such coated parts and plasters, while dry, show an homogeneous appearance with the color transmitted by the coating and, when wetted, can exhibit colors already existing on the substrate, or even drawings, texts, and all kind of desired markings, being again hidden after the coating dries once more.

The process is therefore reversible, very durable and resistant to the weather.

Among generic processes and general applications are included:

Coatings in walls or other structural elements cast in situ or prefabricated in concrete Façades of buildings (large façade elements or prefabricated panels)

Viaduct superstructures and edge beams

Urban furniture and other interior and exterior decorative elements

Information and communication panels invisible when dry

Thin layer coatings of walls such as plasters and tinplating pastes.

Compared to products of similar performance, those herein described stand out by the possibility of becoming invisible in the presence of water, making it possible to read all patterns present in the substrate, keeping dry the texture and appearance of the most homogeneous architectural concrete, mortar, or ceramic and cement material where it is applied.

It is an aqueous acrylic solution with cementitious fillers usually consisting in white cement of high brightness and strength, modified by polymers and copolymers so as to allow stabilization of a hydrochromatic acrylic copolymer.

On the other hand the addition of a series of super-plasticizers based on polycarboxylates, melamine and others with waterproofing effect, such as calcium and zinc stearates, as well as modified polyvinyl resins, makes it possible to obtain an effective reduction of the mixing water and high compactness compatible with the desired mechanical performance, also helping stability and action of the pigment of the copolymer, as well as enhancing the coating adhesion and durability.

OBJECT OF THE INVENTION

The object of present invention is therefore a white or colored surface coating with hydrochromatic properties, homogeneous, with appearance similar to demolded concrete or with the texture of supporting mortar, for covering micro-concrete and concrete, mortar or other building materials based on cement and ceramics. Therefore those materials are able, while dry, to show an homogeneous appearance with the color transmitted by the coating and, when wetted, they can exhibit colors already existing on the substrate, as well as drawings, text, and all kind of desired inscriptions, being again hidden after the coating dry once more, wherein the color change is reversible and very durable and resistant to the weather. Said coating comprises the following components, in percentage in weight of the components relative to the total weight of the composition:

a) 0.5-30% of hydrochromatic acrylic copolymer emulsion;
b) 5-30% of Portland cement;
c) 0.1-30% of finely ground limestone filler;
d) 0.01-2% of super-plasticizer;
e) 0.01-3% of modified polyvinyl resins;
f) 0.01-5% of dispersant of vinyl acetate and ethylene copolymers;
g) 15-70% of aqueous acrylic emulsion; and optionally
h) 0.1-15% of inorganic pigments.

The Portland cement b) may be gray or white depending on the hue desired to the coating.

The component c) typically has a particle size less than 90 microns.

Usually component d) consists of sulfonated melamine condensates, or equivalent.

The component e) is generally present in a percentage by weight of 0.2-1.0%, component f) is present in a weight percentage often between 0.5% and 1.0%, and component g) is present in a percentage by weight usually of 50-60%.

The component h) is present in a usual dosage of 1-5% and may present itself in various hues, normally consisting of metal oxides.

PREPARATION EXAMPLES

An example is given of preparing a coating for white concrete with graffiti to be coated according to the invention so as to become invisible in dry weather. This example is intended to better illustrate the invention without any limitation on the content thereof.

Example 1

Hydrochromatic Cementitious Coating for Concrete in White Hue:

|   | Component | Weight % |
|---|---|---|
| 1 | White Portland cement | 10.0 |
| 2 | Finely ground limestone filler | 10.0 |
| 3 | Condensate of sulfonated melamine | 0.2 |

-continued

|   | Component | Weight % |
|---|---|---|
| 4 | Modified polyvinyl resin | 0.04 |
| 5 | Dispersant of vinyl acetate and ethylene copolymers | 0.6 |
| 6 | Hydrochromatic acrylic copolymer emulsion | 19.16 |
| 7 | Aqueous acrylic emulsion | 60.0 |

Manufacturing Steps:

Place the components 1, 2, 3 and 4 in the mixer, subsequently add component 5. Mix separately components 6, 7 and add to previous mixture. Mix for at least 120 s. The coating is ready to use. Apply on the surface with a paint roller in at least two coats, in the absence of rain, excessive humidity or temperatures below 5° C., in a clean surface.

The invention claimed is:

1. A white or colored surface coating with hydrochromatic properties, homogeneous, for covering micro-concrete and concrete, mortars, or other construction materials based on cement and ceramics, characterized in that it comprises the following components, in percentage in weight of the components relative to the total weight of the composition:

a) 0.5-30% of hydrochromatic acrylic copolymer emulsion;
b) 5-30% of Portland cement;
c) 0.1-30% of finely ground limestone filler;
d) 0.01-2% of super-plasticizer;
e) 0.01-3% of modified polyvinyl resins;
f) 0.01-5% of dispersant of vinyl acetate and ethylene copolymers;
g) 15-70% of aqueous acrylic emulsion; and optionally
h) 0.1-15% of inorganic pigments.

2. The coating according to claim 1, characterized in that the component b) is white or gray Portland cement.

3. The coating according to claim 1, characterized in that the component c) typically has a particle size less than 90 microns.

4. The coating according to claim 1, characterized in that the component d) is composed of sulfonated melamine condensates.

5. The coating according to claim 1, characterized in that the component e) is present in a percentage by weight of 0.2-1.0%, component f) is present in a percentage by weight of 0.5-1%, and component g) is present in a percentage by weight of 50-60%.

6. The coating according to claim 1, characterized in that the component h) consists of inorganic pigments based on metal oxides and is present in a percentage by weight of 1-5%.

* * * * *